UNITED STATES PATENT OFFICE.

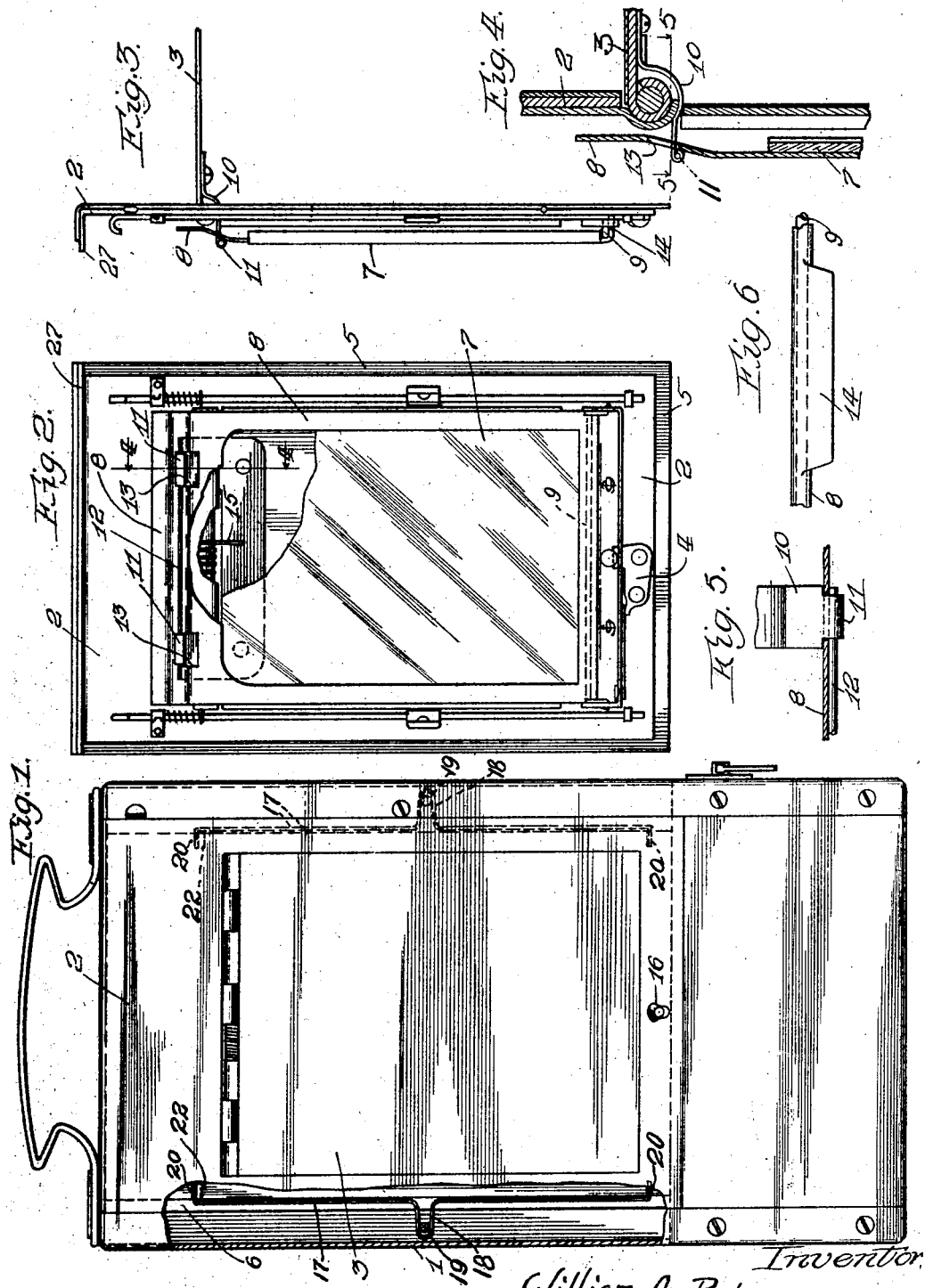

WILLIAM A. PETERS, OF CHICAGO, ILLINOIS, ASSIGNOR TO INTERNATIONAL PATENT LICENSING CORPORATION, OF CHICAGO, ILLINOIS, A CORPORATION OF DELAWARE.

PHOTOGRAPHIC CAMERA.

1,374,678.　　　　Specification of Letters Patent.　　Patented Apr. 12, 1921.

Substitute for application Serial No. 34,978, filed June 19, 1915. This application filed October 13, 1919. Serial No. 330,680.

*To all whom it may concern:*

Be it known that I, WILLIAM A. PETERS, a citizen of the United States, residing at Chicago, in the county of Cook and State of Illinois, have invented certain new and useful Improvements in Photographic Cameras; and I do hereby declare the following to be a full, clear, and exact description of the invention, such as will enable others skilled in the art to which it appertains to make and use the same.

My invention relates to cameras, and more particularly to means for accurately focusing film cameras and for enabling plates to be used instead of films in cameras primarily designed for use with films. In building film cameras it has heretofore been customary to dispense with the use of a ground glass plate for accurate focusing, as the position of the film interfered with such a practice.

Consequently, it has been impossible to obtain the exact focusing which is so desirable in many classes of photography. However, in my co-pending application for Letters Patent for improvements in cameras, filed July 17, 1920, Serial No. 399,578, I have shown a camera in which both film rolls may readily be moved entirely out of the cone of light of the camera, thereby presenting the possibility of using a ground glass plate for the focusing. In one aspect of my present invention I am aiming to provide means actuated by the opening of a rear door on the casing of the camera for moving a ground glass plate so as to bring the ground surface of the latter into the plane occupied by the sensitive face of the film when the latter is being exposed and likewise to provide means actuated by the closing of the door for moving this plate out of the path of the film and film rolls. Furthermore, I aim to provide means for maintaining the ground glass plate in its said focusing plane and simultaneously holding the rear door open, so as to facilitate the focusing.

In another aspect of my invention I aim to provide simple means for permitting a plate holder to be inserted in the casing of the same camera when the film rolls are both positioned outside the cone of light of the camera; for guiding the plate holder to bring the sensitive face of the active plate into the focal plane of the camera, for latching the plate holder in operative position, for preventing the entrance of light around the plate holder and for automatically closing the opening through which the plate holder was inserted, upon a withdrawal of the latter.

Further objects will appear from the following specification and from the accompanying drawings, in which—

Figure 1 is a rear elevation of the camera, with a portion of the casing cut away.

Fig. 2 is a front elevation of the auxiliary or movable part of the rear of the casing, with a portion of the ground glass cut away.

Fig. 3 is a side elevation of the same auxiliary part with the door swung open and partly cut off.

Fig. 4 is an enlarged fragmentary section through Fig. 2 along the line 4—4.

Fig. 5 is a fragmentary section through Fig. 4 along the line 5—5.

Fig. 6 is an enlarged fragmentary view of the lower portion of the frame carrying the ground glass.

In carrying out my invention I construct the main portion of the camera casing with a rear opening of large area which extends to and into a part of the top wall of the casing, and normally close this entire opening by a closure member having its outer surfaces substantially flush with the rear and top surfaces of the main portion 1 of the casing. As shown in the drawings, this closure member consists of a plate 2 having a rectangular opening therein which is closed by means of a door 3 hinged to said plate and normally maintained closed by means of a latch 4. The plate 2 preferably has peripheral ledges 5 overlapping corresponding ledges 6 on the main portion of the casing and thereby preventing the entrance of light through these joints.

Within the casing and immediately in front of the opening in the plate 2 is a ground glass plate 7, which plate preferably has its rear face roughened while its forward face is left smooth so as to afford a substantially frictionless guide for the film when the latter is stretched as described in my aforesaid co-pending application.

Then, when the ground glass is to be used for the focusing, the ground surface must be brought into the exposure plane or the plane to be occupied by the sensitized film surface to be exposed. For this purpose the ground glass must be moved a predetermined distance along the optical axis of the camera, this distance being at least equal to the thickness of the glass plate. To accomplish this accurately and without special manipulation I do not secure the glass plate rigidly to the said frame 2, but mount it in a secondary frame 8 connected to the frame 2 by upper and lower links affording a parallel motion. In the particular embodiment illustrated in the drawings, the lower links 9 are pivoted to both frames 2 and 8, while the upper links 10 are fast upon the door 3 and have their free ends 11 curled around a rod 12 extending laterally of the frame 8. These curled ends project through perforations 13 in the frame 8 and the links 10 are widened adjacent to said frame to afford shoulders abutting against the latter, which shoulders cooperate with the rod 12 to prevent the frame 8 from moving in a direction transverse to the said frame. Consequently, when the door 3 is swung open, the links 10 will move from the position of Fig. 2 to that of Figs. 3 and 4 carrying the frame 8 (and hence the ground glass) forward of the casing and downwardly until the motion is stopped by the abutting of a projection 14 on the frame 8 against a ledge on the lower part of the frame 2. Movement of the door in the said direction is effected by a spring 15, so that on pressing a button 16 (Fig. 1) which releases the latch 4, this spring opens the door and moves the ground glass forward to a position in which the ground surface of the latter is in the focal plane of the camera.

Instead of securing the plate 2 or closure member rigidly to the casing, I preferably connect the two by springs 17 disposed at opposite sides of said frame, so as to afford a yielding support for the latter. Each spring 17 has a central bend 18 passing around a screw 19 for anchoring the spring in position, and has tips 20 directed laterally of the casing and entering bores 21 and 22 in the plate 2, at least one of said bores being vertically elongated. This yielding connection of the back plate 2 with the body of the camera permits the back to be separated from the body a sufficient distance to permit the insertion of a plate holder, if it is desired to use one instead of a film.

While I have illustrated the preferred embodiment of the invention in the accompanying drawings, it will be understood, of course, that the same may be changed and varied in its specific details without departing from the spirit of the invention as defined in the appended claims.

I claim as my invention:

1. In a camera, the combination with a casing having a rear opening and a door pivoted to the casing and normally closing said opening, of a ground glass disposed within the casing and normally presenting a smooth forward surface substantially in the focal plane of the camera, links connecting the upper end of said ground glass with the casing; means connecting the lower end of the ground glass plate to the door movable in unison with the links for maintaining the glass parallel to its original position, and stop means associated with the door for limiting the opening movement thereof: said connecting means, links and stop means relatively so disposed that the opening of the door to its said limiting position will move the ground glass to present the roughened surface thereof substantially in the focal plane of the camera.

2. In a camera, the combination with a casing having a rear opening and a door pivoted to the casing and normally closing said opening, of a ground glass disposed within the casing and normally presenting a smooth forward surface substantially in the focal plane of the camera, links connecting the upper end of said ground glass with the casing; connecting means substantially parallel to said links and connecting the lower end of the ground glass with the door, and stop means associated with the door for limiting the opening movement thereof: said connecting means, links and stop means relatively so disposed that the opening of the door to its said limiting position will move the ground glass to present the roughened surface thereof substantially in the focal plane of the camera, and means for maintaining said plate with its faces continuously disposed substantially at right angles to the axis of the cone of light of the camera.

WILLIAM A. PETERS.